United States Patent [19]

Schaeffer

[11] Patent Number: 4,617,703

[45] Date of Patent: Oct. 21, 1986

[54] DEVICE FOR TIGHTENING CHAINS AND THE LIKE

[76] Inventor: Richard J. Schaeffer, 10981 Westview Pl., Delta, British Columbia, Canada, V4E 2L9

[21] Appl. No.: 659,969

[22] Filed: Oct. 11, 1984

[51] Int. Cl.[4] .............................................. B25G 3/00
[52] U.S. Cl. .............................. 24/68 CT; 24/68 TT; 24/278; 403/22; 403/343; 81/15.8
[58] Field of Search .......... 24/68 CT, 68 TT, 68 CD, 24/278, 279, 282; 59/93, 95; 403/22, 343; 152/213 R, 217; 81/15.8; 248/219.4

[56] References Cited

U.S. PATENT DOCUMENTS

| 706,090 | 8/1902 | Neville | 24/278 |
|---|---|---|---|
| 727,651 | 5/1903 | Loetscher | 24/279 |
| 1,386,109 | 8/1921 | Hatfield | 24/68 CT |
| 2,087,328 | 7/1937 | Mitchnick | 24/279 |
| 2,120,497 | 6/1938 | Heinrich | 24/68 CT |
| 2,247,642 | 7/1941 | Neville | 24/278 |
| 2,298,115 | 10/1942 | Felton et al. | 24/68 CT |
| 2,507,376 | 5/1950 | Klein | 81/15.8 |
| 4,131,264 | 12/1978 | Patterson, III et al. | 24/68 CT |
| 4,157,171 | 6/1979 | Hasselas | 24/68 CT |
| 4,429,847 | 2/1984 | Jablonski et al. | 24/279 |

FOREIGN PATENT DOCUMENTS

| 245603 | 8/1947 | Switzerland | 24/282 |
|---|---|---|---|
| 1132598 | 11/1968 | United Kingdom | 24/279 |

Primary Examiner—Victor N. Sakran
Attorney, Agent, or Firm—Barrigar & Oyen

[57] ABSTRACT

A device for tightening chains, cables or ropes is disclosed. Previously, turnbuckles or load binders, the latter operating on the principle of the lever, have been used to tighten two ends of a chain or cable around an object, or the ends of two chains which have been secured at their other ends. Such devices are hand-operated and accordingly can only apply limited tension to the chain or cable. The present invention provides a device whereby an air-gun or pneumatic wrench or other power tool can be used to tighten the chain or cable to much greater tension. The device utilizes a threaded bolt which is secured to one end of the chain and which, by the rotation of a threaded socket, is drawn through a sleeve to which the other end of the chain is secured, thereby tightening the chain.

7 Claims, 3 Drawing Figures

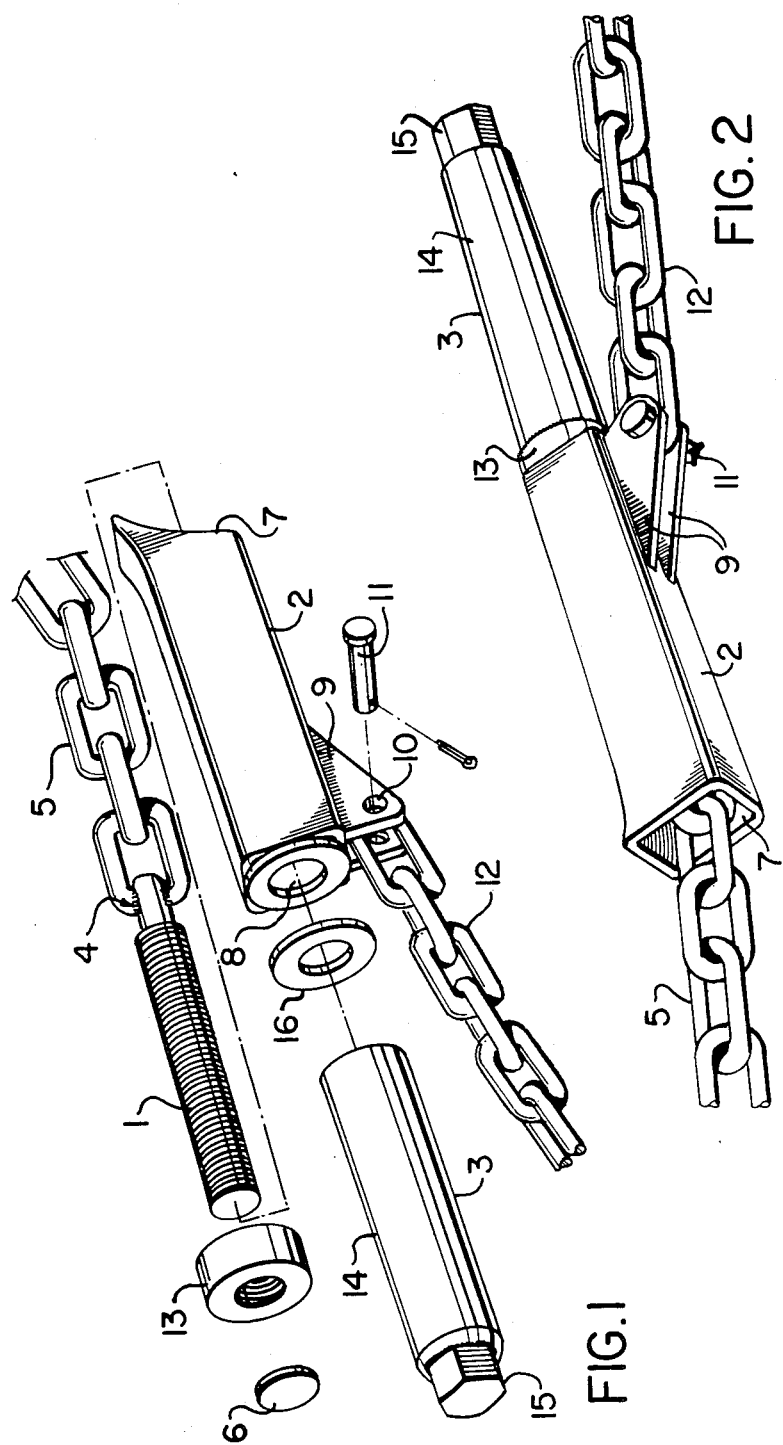

DEVICE FOR TIGHTENING CHAINS AND THE LIKE

BACKGROUND OF THE INVENTION

1. Field of the Invention

The invention pertains to the field of devices such as turnbuckles for tightening or taking up slack in chains, cables, ropes and the like.

2. Description of the Prior Art

In many applications, it is necessary to tighten or take up the slack in a chain, cable or rope particularly by drawing the two ends of the chain together around an object, or drawing together the ends of two chains whose ends are secured. Typically this has been done in the past by securing each end of the chain or cable or the ends of two chains or cables to the opposite ends of a turnbuckle and rotating the sleeve of the turnbuckle by hand. The amount of tensioning which can be accomplished by hand can be increased through the principle of the lever by inserting a bar or screwdriver through the opening in the turnbuckle and applying pressure at the end of the bar to rotate the sleeve. However, the amount of tension which can be applied in this manner is clearly limited.

For example, in a body shop environment, chains are commonly used to tie down the damaged vehicle while it is mounted on a stand and secure it so that work may be performed on the vehicle without the danger of the vehicle falling off the stand. At present, such chains are tightened using a turnbuckle but sufficient tension to maintain the vehicle in a rigid position cannot be obtained through hand-tightening of the turnbuckle. Similarly, loads on a truck or boat are often tied down using chains. In this application, load binders are often used to tighten the chain. These binders work on the principle of the lever and are locked in the closed position when the point of rotation passes through a point of highest tension into a rest position of slightly lower tension. This serves to retain the load binder in the closed position. However, because of the slight slackening involved in this locking method and because they are applied by hand, such binders cannot secure the chain under extreme tension.

SUMMARY OF THE INVENTION

The present invention provides a device for tightening chains and the like which comprises an elongate threaded bolt element which is secured to a fixed end of a chain, a sleeve element to which a second retractable end of a chain is secured and which receives the bolt and attached chain and which prevents rotation of the chain, and means for threadably receiving the bolt element and drawing it through the sleeve element. In the preferred form, the means for threadably receiving the bolt element consists of a threaded socket having a hexagonal end which can be turned using a wrench or air-gun. Further in one aspect of the invention, the bolt is provided with a stopper which prevents it from falling completely out of the sleeve. Further according to one aspect of the invention, a short length of chain is welded to the bolt element so that a hook or other means may be used to connect the device to the end of the chain or cable to be tightened. According to yet another aspect of the invention, the acute angle formed between the device and the chain being shortened is minimized. Conversely, the obtuse angle formed by the device and the chain is maximized. The component of force applied along the chain to be tightened is thereby maximized. According to a further aspect of the invention, a hydraulic cylinder may be utilized to draw the chain into the sleeve, rather than a threaded bolt. In this embodiment, the sleeve need not prevent the rotation of the chain.

BRIEF DESCRIPTION OF THE DRAWINGS

In drawings which illustrate an embodiment of the invention,

FIG. 1 is a perspective view showing the device of the present invention in disassembled form with chain attached;

FIG. 2 is a perspective view showing the device illustrated in FIG. 1 in an assembled state.

DESCRIPTION OF A PREFERRED EMBODIMENT

Figure 3:
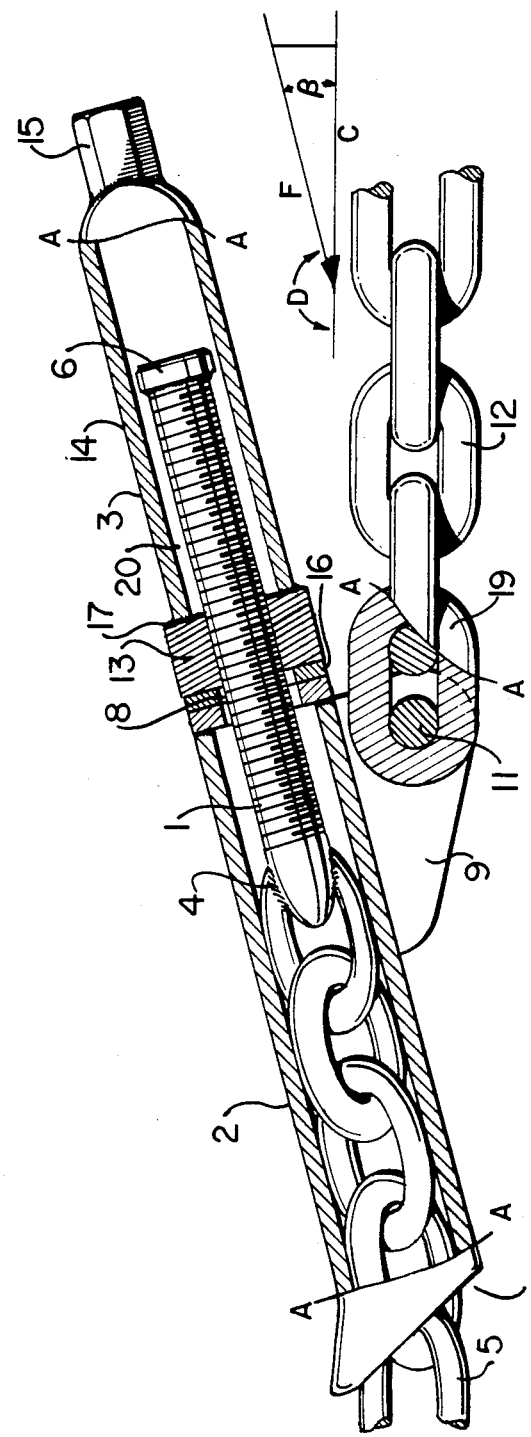
FIG. 3 is a side view of the device illustrated in FIG. 1 cut away along lines A—A to show the interior of the device in cross-section.

Referring to FIG. 1, the chain-tightening device consists of three central components: a threaded bolt element 1, a hollow elongated sleeve 2 and a socket 3 into which a bolt 1 is threaded. The lengths of bolt 1 and socket element 3 are chosen according to the amount of shortening required to be carried out by the device. One end of bolt 1 is attached to a flexible linkage such as by welding (as at 4) onto a short length of cable or chain 5. Chain 5 may then be secured to the first retractable end of the length of chain to be tightened using conventional means such as a hook or clip (not shown). Other means may be used to secure the end of bolt 1 to the chain or cable to be tightened, such as by providing the end of the bolt with an eye or hook. Where a length of chain 5 is used as shown in FIG. 1, the chain must be somewhat longer than sleeve 2 so that the travel of the bolt will not be interrupted by contact between the hook at the end of chain 5 and the sleeve 2. Bolt 1 is provided at one end with a circular stopper 6 which will be further described below.

Sleeve 2 consists of a hollow tube having an open end 7 and a circular opening 8 at the other end through which bolt 1 passes. Where the device is used to tighten chain, the sleeve is preferably rectangular in cross-section and so dimensioned that the chain is prevented from turning within the sleeve. Preferably the sleeve is constructed from heavy metal tubing and opening 8 may be formed by welding a metal washer to the end of the tube. Sleeve 2 has a pair of flanges or lobes 9 attached to its lower side adjacent opening 8. These are provided with holes 10 to receive pin 11. The end of the chain to be tightened 12 is secured to the sleeve 2 by means of pin 11. Preferably, pin 11 is located so that the fixed end of the chain is aligned to form a 180° angle with the retractable end of the chain where it enters sleeve 2. Flanges 9 are configured so that sleeve 2 is offset with respect to the chain to be tightened to allow access to the device with a power tool, and to maximize the effective tensioning force.

In constructing the preferred form of the device, bolt 1 must be inserted through aperture 8 and washer 16 and threaded element 13 threaded onto the bolt before stopper 6 has been welded to the end of the bolt. Once stopper 6 has been attached, socket element 14 is secured to threaded element 13 by welding at 17 (see FIG. 3).

Referring to FIG. 3, bolt 1 is drawn through hole 8 by the action of threaded socket 3. Socket 3 has threaded end 13 which mates with the threads of bolt 1. The end of bolt 1 travels into a hollow socket portion 14 of element 3 which has at one end a hexagonal projection 15 suited to be turned by a wrench or air-gun. Washer 16 may be interposed between element 3 and sleeve 2 in order to increase the durability of the device.

Operation of the device may be understood by referring to FIG. 3. Chain 5 is secured to the first retractable end of chain by a hook or other means. Where a single chain is being tightened around an object, the second end of chain 12 is passed around the load or structure to be secured and is then attached to flanges 9 by passing pin 11 through the end link 19. Where two chains are being drawn together, the end of the fixed chain 12 is similarly attached by means of pin 11. An air-gun or other power operated or hand-operated wrench is then applied to end 15 to turn the socket element 3. The action of threaded element 13 rotating on bolt 1 causes the bolt to be drawn into socket element 3 which bears against washer 16. Chain 5 is prevented from rotating within the sleeve by the shape and dimension of sleeve 2. As socket 3 is rotated, the retractable end of chain secured to linkage 5 is drawn towards fixed end 12 and the chain is tightened. It has been found that using a ⅜ inch chain and an air-gun to turn nut 15, a tension on the order of 2 tons can be applied to the chain.

An important feature of the invention which permits high tension to be applied to the chain or cable is the fact, illustrated in FIG. 3, that the ends of the chain 12 remain substantially aligned as the chain is being tightened, and the angle B is minimized. By minimizing angle B, (or, conversely, maximizing angle D), while maintaining enough clearance between the chain and socket element 3 to permit access to the device for tightening with a power tool, the component of the applied force F which lies along the direction of the chain, indicated as C, is maximized. Consequently the applied force is transalted most efficiently into tension along the chain and higher tension may be achieved.

In a second embodiment of the invention, hydraulic force may be substituted for the screw action shown in the embodiment illustrated. In this embodiment, a smooth shaft of circular cross-section is substituted for the threaded bolt 1. The shaft would enter a hydraulic cylinder corresponding to socket element 3 through a sealed aperture. The end of the shaft would be provided with a piston (in a location similar to that of stopper 6). Hydraulic fluid under pressure would be provided to the cylinder at location 20 in FIG. 3, thereby driving the piston and drawing chain 5 into the sleeve, tightening the chain. In this embodiment, it would not be necessary to prevent chain 5 from turning within the sleeve, and accordingly a rectangular sleeve would not necessarily be preferred for chain tightening.

The embodiment illustrated has been designed for tightening ⅜th-inch chain and accordingly is shown as being constructed of strong and durable materials. The principle of the invention may be applied to the tightening of lighter chains, cables or ropes, in which case less durable materials might be substituted. For example, a smaller cable might be substituted for chain 5. In that case, the cable or rope would be provided with means to prevent rotation within the sleeve 2. Also, stopper 6 may be dispensed with without reducing the utility of the invention and the use of washer 16 is not necessary to the invention. A standard nut could be substituted for socket element 3 if the device was only to be hand-tightened. As will be apparent to persons skilled in the art, various other modifications and adaptations of the structure above described are possible without departure from the spirit of the invention, the scope of which is defined in the appended claims.

I claim:

1. A device for tightening chains, straps, ropes or cable comprising:
   (a) an elongated, threaded element adapted to be secured at one end thereof to a first end of a chain, strap, rope or cable;
   (b) a hollow sleeve element open at one end and having at the opposite end an aperture adapted to allow the passage of said elongated threaded element, wherein said sleeve element is configured to prevent rotation of said chain, strap, rope or cable;
   (c) means for securing said sleeve element to a second end of a chain, strap, rope or cable; and
   (d) a hollow, tubular member adapted at a first end thereof to threadably receive said threaded element and bear against the exterior of said second end of said sleeve element whereby rotation of said means for threadably receiving causes said threaded element to be drawn through said opening in said sleeve element thereby tightening said chain or chains, strap or straps, rope or ropes, or, cable or cables, and wherein said tubular member further comprises means for applying a tool at a second end thereof in order to rotate said tubular member.

2. The device of claim 1 wherein said elongated threaded element is adapted to be secured at one end to said first end of a chain, strap, rope or cable by means of a flexible linkage secured to one end of said threaded element.

3. The device of claim 1 wherein said threaded element is provided with means adjacent the second end of said threaded element to prevent said threaded element from being withdrawn from said means for threadably receiving.

4. The device of claim 1 wherein said first end of a chain, strap, rope or cable adjacent said open end of said sleeve element and said second end of a chain, strap, rope or cable are substantially colinear.

5. The device of claim 4 wherein said sleeve element forms an acute angle with said first and second ends of a chain, strap, rope or cable.

6. The device of claim 5 wherein said acute angle is minimized and the obtuse angle which is adjacent to and supplementary to said acute angle is maximized, thereby maximizing the component of force applied by the device along said chain or chains, strap or straps, rope or ropes, or, cable or cables.

7. The device of claim 6 wherein said means for securing said sleeve element to said chain, strap, rope or cable is adjacent said opposite end of said sleeve element.

* * * * *